United States Patent
Worsley et al.

(10) Patent No.: US 9,852,824 B2
(45) Date of Patent: Dec. 26, 2017

(54) METHODS FOR CONTROLLING PORE MORPHOLOGY IN AEROGELS USING ELECTRIC FIELDS AND PRODUCTS THEREOF

(75) Inventors: Marcus A. Worsley, Hayward, CA (US); Theodore F. Baumann, Discovery Bay, CA (US); Joe H. Satcher, Jr., Patterson, CA (US); Tammy Y. Olson, Livermore, CA (US); Joshua D. Kuntz, Livermore, CA (US); Klint A. Rose, Alviso, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 947 days.

(21) Appl. No.: 13/180,440

(22) Filed: Jul. 11, 2011

(65) Prior Publication Data

US 2012/0052511 A1 Mar. 1, 2012

Related U.S. Application Data (60) Provisional application No. 61/376,484, filed on Aug. 24, 2010.

(51) Int. Cl.
  *B01J 13/00* (2006.01)
  *H01B 1/08* (2006.01)

(52) U.S. Cl.
  CPC ...... *H01B 1/08* (2013.01); *Y10T 428/249953* (2015.04); *Y10T 428/249986* (2015.04)

(58) Field of Classification Search
  CPC .... H01B 1/00; H01B 1/04; H01B 1/08; B32B 3/26; B32B 5/22; C12N 5/00;
  (Continued)

(56) References Cited

U.S. PATENT DOCUMENTS

| | | | |
|---|---|---|---|
| 3,804,034 A | 4/1974 | Stiglich, Jr. | |
| 4,464,206 A | 8/1984 | Kumar et al. | |
| 5,476,878 A * | 12/1995 | Pekala | 521/61 |
| 6,001,251 A * | 12/1999 | Asher et al. | 210/500.22 |
| 6,114,048 A | 9/2000 | Jech et al. | |

(Continued)

FOREIGN PATENT DOCUMENTS

| | | | |
|---|---|---|---|
| DE | 102008027418 A1 | * | 12/2009 |
| EP | 1 009 802 B1 | | 8/2004 |

(Continued)

OTHER PUBLICATIONS

Machine translation oF DE 102008027418 A1, obtained on http://worldwide.espacenet.com/?locale=EN_ep (downloaded Dec. 1, 2014).*

(Continued)

*Primary Examiner* — Daniel S Metzmaier
(74) *Attorney, Agent, or Firm* — Zilka-Kotab, PLC (57) ABSTRACT

In one embodiment, an aerogel or xerogel includes column structures of a material having minor pores therein and major pores devoid of the material positioned between the column structures, where longitudinal axes of the major pores are substantially parallel to one another. In another embodiment, a method includes heating a sol including aerogel or xerogel precursor materials to cause gelation thereof to form an aerogel or xerogel and exposing the heated sol to an electric field, wherein the electric field causes orientation of a microstructure of the sol during gelation, which is retained by the aerogel or xerogel. In one approach, an aerogel has elongated pores extending between a material arranged in column structures having structural characteristics of being formed from a sol exposed to an electric field that causes orientation of a microstructure of the sol during gelation which is retained by the elongated pores of the aerogel.

10 Claims, 5 Drawing Sheets

(58) Field of Classification Search
CPC .............. G01N 33/53; B01J 13/0091; Y10T 428/249953; Y10T 428/249986
USPC .......................................................... 516/98
See application file for complete search history.

(56) References Cited

U.S. PATENT DOCUMENTS

| | | | |
|---|---|---|---|
| 6,355,420 | B1 | 3/2002 | Chan |
| 7,048,963 | B2 | 5/2006 | Braithwaite et al. |
| 7,368,044 | B2 | 5/2008 | Cohen et al. |
| 7,471,362 | B1 | 12/2008 | Jones |
| 7,776,682 | B1* | 8/2010 | Nickel et al. ................ 438/239 |
| 8,685,287 | B2* | 4/2014 | Worsley et al. .............. 252/510 |
| 8,703,523 | B1* | 4/2014 | Biener et al. .................... 438/82 |
| 8,809,230 | B2* | 8/2014 | Worsley et al. .............. 502/417 |
| 8,968,865 | B2* | 3/2015 | Worsley et al. ........... 428/322.7 |
| 9,290,855 | B2 | 3/2016 | Worsley et al. |
| 9,453,289 | B2 | 9/2016 | Rose et al. |
| 2002/0119455 | A1 | 8/2002 | Chan |
| 2003/0141618 | A1 | 7/2003 | Braithwaite et al. |
| 2004/0216486 | A1 | 11/2004 | Schwertfeger et al. |
| 2004/0217010 | A1* | 11/2004 | Hu et al. ........................ 205/341 |
| 2005/0019488 | A1 | 1/2005 | Braithwaite et al. |
| 2005/0208121 | A1 | 9/2005 | Barton et al. |
| 2005/0255304 | A1* | 11/2005 | Brink ............................. 428/209 |
| 2005/0285291 | A1* | 12/2005 | Ku et al. .......................... 264/44 |
| 2006/0099135 | A1* | 5/2006 | Yodh ...................... B82Y 10/00 423/447.1 |
| 2006/0159722 | A1 | 7/2006 | Braithwaite et al. |
| 2006/0228401 | A1 | 10/2006 | Braithwaite et al. |
| 2006/0249388 | A1 | 11/2006 | Chang et al. |
| 2006/0289310 | A1 | 12/2006 | Matson et al. |
| 2007/0282439 | A1* | 12/2007 | Zehbe et al. ............... 623/16.11 |
| 2008/0006574 | A1* | 1/2008 | Ramaswamy et al. ....... 210/490 |
| 2009/0002617 | A1 | 1/2009 | Jones |
| 2009/0020924 | A1 | 1/2009 | Lin |
| 2009/0036557 | A1* | 2/2009 | Ratke et al. ................... 516/111 |
| 2009/0189315 | A1 | 7/2009 | Gunster et al. |
| 2009/0228115 | A1 | 9/2009 | Liu et al. |
| 2009/0288952 | A1 | 11/2009 | Olevsky et al. |
| 2010/0074787 | A2 | 3/2010 | Neirinck et al. |
| 2010/0105539 | A1 | 4/2010 | Hollingsworth et al. |
| 2010/0230629 | A1 | 9/2010 | Yu et al. |
| 2011/0014258 | A1 | 1/2011 | Gan et al. |
| 2011/0024698 | A1* | 2/2011 | Worsley et al. .............. 252/511 |
| 2011/0104491 | A1 | 5/2011 | Shaw et al. |
| 2011/0250467 | A1* | 10/2011 | Rose et al. ..................... 428/610 |
| 2012/0133428 | A1 | 5/2012 | Forbes et al. |
| 2012/0269218 | A1 | 10/2012 | Worsley et al. |
| 2012/0308622 | A1 | 12/2012 | Clarkson et al. |
| 2013/0004761 | A1* | 1/2013 | Worsley et al. ........... 428/310.5 |
| 2013/0078476 | A1 | 3/2013 | Riman et al. |
| 2016/0348262 | A1 | 12/2016 | Rose et al. |
| 2016/0355944 | A1 | 12/2016 | Rose et al. |

FOREIGN PATENT DOCUMENTS

| | | |
|---|---|---|
| EP | 1 234 207 B1 | 7/2005 |
| EP | 2 103 719 A1 | 9/2009 |
| WO | 9409048 A1 | 4/1994 |
| WO | 98/35012 A2 | 8/1998 |
| WO | 99/18892 A1 | 4/1999 |
| WO | 01/40853 A1 | 6/2001 |
| WO | 2004/050134 A3 | 6/2004 |
| WO | 2007092363 A2 | 8/2007 |
| WO | 2008/021191 A2 | 2/2008 |
| WO | 2011053598 A1 | 5/2011 |

OTHER PUBLICATIONS

Hawley's Condensed Chemical Dictionary, (2007), John Wiley & Sons, Inc. Online @ http://onlinelibrary.wiley.com/mrw/advanced/search?doi=10.1002/9780470114735 , downloaded Sep. 26, 2014), pp. 1-3.*

Fukasawa et al, Pore structure of porous ceramics synthesized from water-based slurry by freeze-dry process, Journal of Materials Science 36 (2001) 2523-2527.*

Bock et al, "Structural Investigation of Resorcinol Formaldehyde and Carbon Aerogels Using SAXS and BET", Journal of Porous Materials 4, 287-294 (1997).*

Baumann et al, High surface area carbon aerogel monoliths with hierarchical porosity, Journal of Non-Crystalline Solids, 354 (2008) 3513-3515.*

Baumann et al, Template-directed synthesis of periodic macroporous organic and carbon aerogels, Journal of Non-Crystalline Solids 350 (2004) 120-125.*

Ryong Ryoo et al, Ordered Mesoporous Carbons, Adv. Mater. 2001, 13, No. 9, (May 3, 2001), pp. 677-681.*

Laghzizil et al., "Comparison of Electrical Properties between Fluoroapatite and Hydroxyapatite Materials," Journal of Solid State Chemistry, vol. 156, Issue 1, Jan. 2001, pp. 57-60.*

Vleugels et al., "Thick Plate-Shaped Al2O3/ZrO2 Composites with Continuous Gradient Processed by Electrophoretic Deposition," Mat. Sci. Forum, vol. 423-425, 2003, p. 171-176.

Santillan et al., "Electrophoretic Codeposition of LaO.6Sr0.4CoO.8FeO.2O3-delta and Carbon Nanotubes for Developing Composite Cathodes for Intermediate Temperature Solid Oxide Fuel Cells," International Journal of Applied Ceramic Technology, vol. 7, No. 1, 2010, pp. 30-40.

Ferrari et al., "Thermogelation of Al2O3/y-TZP films produced by electrophoretic co-deposition," Journal of the European Ceramic Society, vol. 24, No. 10-11, 2004, pp. 3073-3080.

Hassanin et al., "Functionally graded microceramic components," Microelectronic Engineering, vol. 87, 2009, pp. 1610-1613.

Hassanin et al., "Infiltration-Processed, Functionally Graded Materials for Microceramic Components," 2010 IEEE, pp. 368-371.

Moritz et al., "ZrO2 ceramics with aligned pore structure by EPD and their characterisation by X-ray computed tomography," Science Direct, Journal of the European Ceramic Society, vol. 30, 2010, pp. 1203-1209.

Olevsky et al., "Fabrication of Tailored Powder Structures by Electrophoretic Deposition and Sintering," Switzerland, Key Engineering Materials, vol. 434-435, 2010, pp. 757-760.

Zaman et al., "3-D micro-ceramic components from hydrothermally processed carbon nanotube-boehmite powders by electrophoretic deposition," Science Direct, Ceramics International, vol. 36, 2010, pp. 1703-1710.

Clasen et al., "Near net shaping with bimodal powders on shaped membranes via EPD," Switzerland, Key Engineering Materials, vol. 412, 2009, pp. 45-50.

Dziomkina et al., "Layer-by-layer templated growth of colloidal crystals with packing and pattern control," Science Direct, Colloids and Surfaces A: Physicochemical and Engineering Aspects, vol. 342, 2009, pp. 8-15.

Moritz et al., "Electrophoretically deposited porous ceramics and their characterisation by X-ray computer tomography," Switzerland, Key Engineering Materials, vol. 412, 2009, pp. 255-260.

Novak et al., "Infiltration of a 3-D Fabric for the Production of SiC/SiC Composites by Means of Electrophoretic Deposition," Switzerland, Key Engineering Materials, vol. 412, 2009, pp. 237-242.

Xu et al., "Fast and Controlled Integration of Carbon Nanotubes into Microstructures," Materials Research Society, Mater. Res. Soc. Symp. Proc., vol. 1139, 2009, pp. 59-64.

Ryan et al., "Vertical Aligned Nanorod Assembly by Electrophoretic Deposition from Organic Solvents," Materials Research Society, Mater. Res. Soc. Symp. Proc, vol. 1121, 2009, pp. 36-40.

Moon et al., "Triply Periodic Bicontinuous Structures as Templates for Photonic Crystals: A Pinch-off Problem," Wiley-VCH Verlag GmbH & Co., Adv. Mater 2007, vol. 19, 2007, pp. 1510-1514.

Tabellion et al., "Shaping of Bulk Glasses and Ceramics with Nanosized Particles," Synthesis and Processing of Nanostructured Materials, Nov. 2006, pp. 129-136.

Van Der Biest et al., "Laminated and functionally graded ceramics by electrophoretic deposition," Trans Tech Publications, Switzerland, Key Engineering Materials, vol. 333, 2007, pp. 49-58.

(56) References Cited

OTHER PUBLICATIONS

Anne et al., "Engineering the Composition Profile in Functionally Graded Materials Processed by Electrophoretic Deposition," Innovative Processing and Synthesis of Ceramics, Glasses and Composites IX, vol. 177, 2006, pp. 45-52.
Hamagami et al., "3D Particle Assembly in Micro-Scale by Using Electrophoretic Micro-Fabrication Technique," Key Engineering Materials Switzerland, vol. 314, 2006, pp. 7-12.
Li et al., "The control of crystal orientation in ceramics by imposition of a high magnetic field," Materials Science and Engineering A, vol. 44, 2006, pp. 227-231.
Oetzel et al., "Preparation of zirconia dental crowns via electrophoretic deposition," J. Mater Sci, 2006, vol. 41, pp. 8130-8137.
Braun et al., "Transparent Alumina Ceramics With Sub-Microstructure by Means of Electrophoretic Deposition," Developments in Advanced Ceramics and Composites, vol. 26, 2005, pp. 97-104.
Takahashi et al., "Growth and Electrochemical Properties of Single-Crystalline V2O5 Nanorod Arrays," 2005 The Japan Society of Applied Physics, vol. 14, No. IB, 2005, pp. 662-668.
Bartscherer et al.. "Improved Preparation of Transparent PLZT Ceramics by Electrophoretic Deposition and Hot Isostatic Pressing," 27th International Cocoa Beach Conference on Advanced Ceramics and Composites, vol. 24, 2003, pp. 169-174.
Boccaccini et al., "The Use of Electrophoretic Deposition for the Fabrication of Ceramic and Glass Matrix Composites," Advances in Ceramic Matrix Composites IX, vol. 153, 2004, pp. 57-66.
Chen et al., "Investigation on the Electrophoretic Deposition of a FGM piezoelectric monomorph acutator," Journal of Materials Science, vol. 38, 2003, pp. 2803-2807.
Ishikawa et al., "Formation Process of Three-Dimensional Arrays from Silica Spheres," Materials, Interfaces, and Electrochemical Phenomena, AIChE Journal, vol. 49, No. 5, 2003, pp. 1293-1299.
Tian et al., "Complex and oriented ZnO nanostructures," Natural Materials, vol. 2, 2003, pp. 821-826.
Kaya, "A1203-Y-TZP/A1203 functionally graded composites of tubular shape from nano-sols using double-step electrophoretic deposition," Journal of the European Ceramic Society, vol. 23, 2002, pp. 1655-1660.
Braun et al., "Transparent Polycrystalline Alumina Ceramic with Sub-Micrometre Microstructure by Means of Electrophoretic Deposition," Materialwissenschaft und Werkstofftechnik, 2006, vol. 37, No. 4, pp. 293-297.
Put et al., "Gradient Profile Prediction in Functionally Graded Materials Processed by Electrophoretic Deposition," Acta Materialia, vol. 51, 2003, pp. 6303-6317.
Olevsky et al., "Fabrication of Net-Shape Functionally Graded Composites by Electrophoretic Deposition and Sintering: Modeling and Experimentation," J. Am. Ceram. Soc., vol. 90, No. 10, 2007, pp. 3047-3056.
Besra et al., "A review on fundamentals and applications of electrophoretic deposition (EPD)," Science Direct, Progress in Materials Science, vol. 52, 2007, pp. 1-61.
Tabellion et al., "Electrophoretic Deposition from Aqueous suspensions for near-shape manufacturing of advanced ceramics and glasses—applications," Journal of Materials Science, vol. 39, 2004, pp. 803-811.
Ryan et al., "Electric-Field-Assisted Assembly of Perpendicularly Oriented Nanorod Superlattices," Nano Letters, vol. 6, No. 7, 2006, pp. 1479-1482.
Ahmed et al.. "Centimetre Scale Assembly of Vertically aligned and close packed semiconductor nanorods form solution," Chem. Commun. Issue 42, 2009, pp. 6421-6423.
Machine translation of DE 102008027418, retrieved from espacenet.com, (downloaded on Jan. 1, 2015).
Final Office Action from U.S. Appl. No. 13/085,405 dated Apr. 8, 2014.
Perry et al., "Phase Characterization of Partially Stabilized Zirconia by Raman Spectroscopy," Journal of American Ceramics Society, vol. 68, No. 8, Aug. 1985, pp. C-184/C-187.
Anne et al., "Electrophorectic Deposition as a Novel Near Net Shaping Technique for Functionality Graded Biomaterials," Materials Science Forum, vols. 492-493, 2005, pp. 213-218.
Shirai et al., "Structural Properties and Surface Characteristics on Aluminum Oxide Powders," Ceramics Research Laboratory, vol. 9, 2009, pp. 23-31.
Non-Final Office Action from U.S. Appl. No. 13/085,405, dated Feb. 27, 2015.
Election/Restriction Requirement from U.S. Appl. No. 13/453,933, dated Apr. 4, 2014.
Non-Final Office Action from U.S. Appl. No. 13/453,933, dated Jul. 10, 2014.
Final Office Action from U.S. Appl. No. 13/453,933, dated Dec. 12, 2014.
Non-Final Office Action from U.S. Appl. No. 13/453,933, dated May 20, 2015.
Sun et al., "Graded/Gradient Porous Biomaterials," Materials, vol. 3, 2010, pp. 26-57.
Election/Restriction Requirement from U.S. Appl. No. 13/085,405 dated May 10, 2013.
Anklam, M. R., D. A. Saville, et al. (1999). "Electric-field-induced rupture of polymer-stabilized oil films." Colloid and Polymer Science 277(10): 957-964.
Bouchet, A., E. Descamps, et al. (2009). "Contactless Electrofunctionalization of a Single Pore." Small 5(20): 2297-2303.
Butsko, Z. L. and P. M. Stadnik (1973). "The formation of polysilicic acid gels in an electric field. The properties of acidic xerogels." Colloid Journal of the USSR 35(2): 303-307.
Cho, H. B., M. Shoji, et al. "Anisotropic alignment of non-modified BN nanosheets in polysiloxane matrix under nano pulse width electricity." Journal of the Ceramic Society of Japan 118(1373): 66-69, (2010).
Findlay, R. B. (1993). "Microstructure of Side-Chain Liquid-Crystalline Polymers and Their Alignment Using Electric-Fields and Surfaces." Molecular Crystals and Liquid Crystals 231: 137-151.
Hasegawa, T., S. Toga, et al. (2004). "Micro-flow control and micropump by applying electric fields through a porous membrane." Jsme International Journal Series B—Fluids and Thermal Engineering 47(3): 557-563.
Hatch, A. V., A. E. Herr, et al. (2006). "Integrated preconcentration SDS-PAGE of proteins in microchips using photopatterned cross-linked polyacrylamide gels." Analytical Chemistry 78(14): 4976-4984.
Holstein, P., M. Bender, et al. (1998). "Reorientation of a liquid crystalline side-chain polymer in electric and magnetic fields investigated by solid-state H-1-NMR." Polymers for Advanced Technologies 9(10-11): 659-664.
Huang, C., Q. M. Zhang, et al. (2003). Electromechanical response in liquid crystal gels and networks. Smart Structures and Materials 2003: Electroactive Polymer Actuators and Devices. Y. BarCohen. 5051: 496-503.
Jun, J. B., C. H. Lee, et al. (2002). "Synthesis and characterizations of monodispersed micron-sized polyaniline composite particles for electrorheological fluid materials." Colloid and Polymer Science 280(8): 744-750.
Kacprzyk, R. (2001). "Piezoelectricity in porous PE foil." Przeglad Elektrotechniczny 77: 147-150.
Legge, C. H., F. J. Davis, et al. (1991). "Memory Effects in Liquid-Crystal Elastomers." Journal De Physique Ii 1(10): 1253-1261.
Liu, S. H., W. C. M. Wang, et al. (2009). "Controlled Deposition of Crystalline Organic Semiconductors for Field-Effect-Transistor Applications." Advanced Materials 21(12): 1217-1232.
Martins, A. F. and A. Veron "Theory and numerical simulation of field-induced director dynamics in confined nematics investigated by nuclear magnetic resonance." Liquid Crystals 37(6-7): 747-771, (Jun.-Jul. 2010).
Matsen, M. W. (2006). "Electric field alignment in thin films of cylinder-forming diblock copolymer." Macromolecules 39(16): 5512-5520.

(56) References Cited

OTHER PUBLICATIONS

Motyl, E., D. Dopierala, et al. (2004). Piezoelectric properties of PZT-HFPP composites. APTADM'2004. Second International Conference on Advances in Processing Testing and Application of Dielectric Materials, Wroclaw, Poland.
Neves, S., C. R. Leal, et al. (2008). Experimental results on electrorheology of liquid crystalline polymer solutions. Xvth International Congress on Rheology—the Society of Rheology 80th Annual Meeting, Pts 1 and 2. A. Co, L. G. Leal, R. H. Colby and A. J. Giacomin. 1027: 1429-1431.
O'Grady, M. L., P. L. Kuo, et al. "Optimization of Electroactive Hydrogel Actuators." Acs Applied Materials & Interfaces 2(2): 343-346, (Dec. 2009).
Ridler, P. J. and B. R. Jennings (1996). "Electrofluorescence of dye-tagged polynucleotides." Polymer 37(22): 4953-4960.
Rozanski, S. A. (2000). "Electrooptical properties of a nematic liquid crystal adsorbed in cellulose membrane." Synthetic Metals 109(1-3): 245-248.
Shimura, H., M. Yoshio, et al. (2009). "Electric-Field-Responsive Lithium-Ion Conductors of Propylenecarbonate-Based Columnar Liquid Crystals." Advanced Materials 21(16): 1591-1594.
Tsori, Y., D. Andelman, et al. (2006). "Block copolymers in electric fields: A comparison of single-mode and self-consistent-field approximations." Macromolecules 39(1): 289-293.
Valentini, L., S. B. Bon, et al. (2008). "Anisotropic Electrical Transport Properties of Aligned Carbon Nanotube/PMMA Films Obtained by Electric-Field-Assisted Thermal Annealing." Macromolecular Materials and Engineering 293(11): 867-871, (2008).
Wakefield, N. and J. Sit (2007). Three-dimensional alignment of liquid crystals in nanostructured porous thin films—art. No. 665404. Liquid Crystals XI. I. C. Khoo. 6654: 65404-65404, (2007).
Wegener, M., W. Wirges, et al. (2007). "Porous polytetrafluoroethylene (PTFE) electret films: porosity and time dependent charging behavior of the free surface." Journal of Porous Material 14(1): 111-118, (Dec. 2006).
Zorn, M., M. N. Tahir, et al. "Orientation and Dynamics of ZnO Nanorod Liquid Crystals in Electric Fields." Macromolecular Rapid Communications 31(12): 1101-1107, (2010).

Tehrani et al., "Effect of Low Field Magnetic Annealing on the Viscoelastic Behavior of a Structural Epoxy," Proceedings of the ASME 2009 International Mechanical Engineering Congress & Exposition, IMECE2009, Nov. 13-19, pp. 1-8, (2009).
Non-Final Office Action from U.S. Appl. No. 13/085,405, dated Sep. 12, 2013, USPTO.
Notice of Allowance from U.S. Appl. No. 13/085,405, dated May 19, 2016.
Final Office Action from U.S. Appl. No. 13/453,933, dated Oct. 23, 2015.
Boccaccini et al., "The Use of Electrophoretic Deposition for the Fabrication of Ceramic Matrix Composites," Advanced Materials Forum, Trans Tech Publications Ltd., vol. 455-456, 2004, pp. 221-224.
Moritz et al., "Electrophoretic deposition of ceramic powders—influence of suspension and processing parameters," Key Engineering Materials, vol. 314, Jan. 2006, pp. 51-56.
Van Der Biest et al., "Electrophoretic shaping of free standing objects," Electrophoretic Deposition: Fundamentals and Applications, Electrochemical Society Proceedings vol. 2002-21, 2002, pp. 62-69.
Notice of Allowance from U.S. Appl. No. 13/453,933, dated Feb. 3, 2016.
Final Office Action from U.S. Appl. No. 13/085,405, dated Mar. 1, 2016.
Laghzizil et al., "Correlation Between Electrical and Structural Properties of Fluorapatites," Phosphorous Research Bulletin, vol. 10, 1999, pp. 381-386.
Non-Final Office Action from U.S. Appl. No. 13/085,405, dated Sep. 12, 2013.
Kacprzyk, R., "Polarization of Porous PE Foil," 11th International Symposium of Electrets, 2002, pp. 207-210.
Wolff et al., "Preparation of polycrystalline ceramic compacts made of alumina powder with a bimodal particle size distribution for hot isostatic pressing," Ceramic Engineering and Science Proceedings, American Ceramic Society, vol. 24, 2003, pp. 81-86.
Non-Final Office Action from U.S. Appl. No. 13/085,405, dated Jul. 21, 2015.

\* cited by examiner

METHODS FOR CONTROLLING PORE MORPHOLOGY IN AEROGELS USING ELECTRIC FIELDS AND PRODUCTS THEREOF

RELATED APPLICATIONS

This application claims priority to U.S. Provisional Patent Application No. 61/376,484 filed on Aug. 24, 2010, and which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to aerogels, and more particularly, to controlling pore morphology in aerogels.

BACKGROUND

Aerogels are a fascinating class of high surface-area, mechanically-robust materials with a broad range of both commercial and fundamental scientific applications. Owing to its highly porous mass-fractal nanostructure, amorphous silica aerogel has been used as a capture agent in NASA's cometary-dust retrieval missions, to control disorder in $^3$He-superfluid phase transitions, in the fabrication of targets for laser inertial confinement fusion, in low-k microelectromechanical systems (MEMS), and in Cherenkov nucleonic particle detectors.

In particular, amorphous carbon aerogel has received a considerable amount of attention in recent years owing to its light weight, low cost, electrical conductivity, mechanical strength, and thermal stability. Numerous applications have been explored for this material, including water desalination, electrochemical supercapacitors, and thermal insulation, among others.

Carbon aerogels are furthermore useful for a number of different applications due to their lightweight, conductive, and fairly robust characteristics. In addition, manipulation of a number of their properties, such as pore size, surface area, and density, are well known. However, if pores of a particular orientation are required, for example, to improve mass transport in a particular direction, such a carbon aerogel could not be produced without hard templating, which adds an additional step to the process. Therefore, in order to reduce processing cost, time, and complexity, it would be useful to expand the control of carbon aerogel properties to include pore orientation.

In addition, manipulation of a number of properties of aerogels, and particularly carbon aerogels, such as pore size, surface area, and density, have been performed before and are capable of being reproduced by those skilled in the art. However, currently, there has not been demonstrated any ability to control the orientation of the major pores of a carbon aerogel, for example, to improve mass transport in a particular direction, without hard templating methods, which add one or more additional steps to the aerogel formation process, and are thus time consuming and less efficient.

Furthermore, the current state of the art in the field of target materials for rare isotope production has not taken advantage of the recent advancements in materials science, particularly the tailoring of microstructures and macrostructures for property optimization. Rare isotope beam (RIB) targets are used at accelerator facilities around the world to generate the desired isotope beams for high energy physics experiments and also for rare isotope production used in industrial and medical applications. Typical target assemblies for use in isotope mass separation on-line (ISOL) facilities must be able to withstand extremely high particle flux and extreme operating temperatures.

Due to extreme operating conditions, the typical target lasts only two to four weeks. The down time associated with target replacement using conventional methods, 1-2 weeks, leads to a significant decrease in both isotope production and beam time available for experiments. Therefore, a method for producing such targets quickly, reliably, and inexpensively would confer great benefit to RIB applications.

SUMMARY

In one embodiment, an aerogel or xerogel includes column structures including a material, the column structures having minor pores therein and major pores devoid of the material positioned between the column structures, with longitudinal axes of the major pores being substantially parallel to one another.

In another embodiment, a method includes heating a sol including aerogel or xerogel precursor materials to cause gelation thereof to form an aerogel or xerogel and exposing the heated sol to an electric field, wherein the electric field causes orientation of a microstructure of the sol during gelation, which is retained by the aerogel or xerogel.

In still another embodiment, an aerogel or xerogel includes elongated major pores extending between a material arranged in column structures, each column structure having a plurality of minor pores therein, wherein a longitudinal axis of each of the elongated major pores are substantially parallel to a single axis, and wherein the aerogel or xerogel has structural characteristics of being formed from a sol exposed to an electric field that causes orientation of a microstructure of the sol during gelation which is retained by the elongated major pores of the aerogel or xerogel.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, an aerogel or xerogel, includes column structures including a material, the column structures having minor pores therein and major pores devoid of the material positioned between the column structures, with longitudinal axes of the major pores being substantially parallel to one another.

In another general embodiment, a method includes heating a sol including aerogel or xerogel precursor materials to cause gelation thereof to form an aerogel or xerogel and exposing the heated sol to an electric field, wherein the electric field causes orientation of a microstructure of the sol during gelation, which is retained by the aerogel or xerogel.

In still another general embodiment, an aerogel or xerogel includes elongated major pores extending between a material arranged in column structures, each column structure having a plurality of minor pores therein, wherein a longitudinal axis of each of the elongated major pores are substantially parallel to a single axis, and wherein the aerogel or xerogel has structural characteristics of being formed from a sol exposed to an electric field that causes orientation of a microstructure of the sol during gelation which is retained by the elongated major pores of the aerogel or xerogel.

Figure 1:
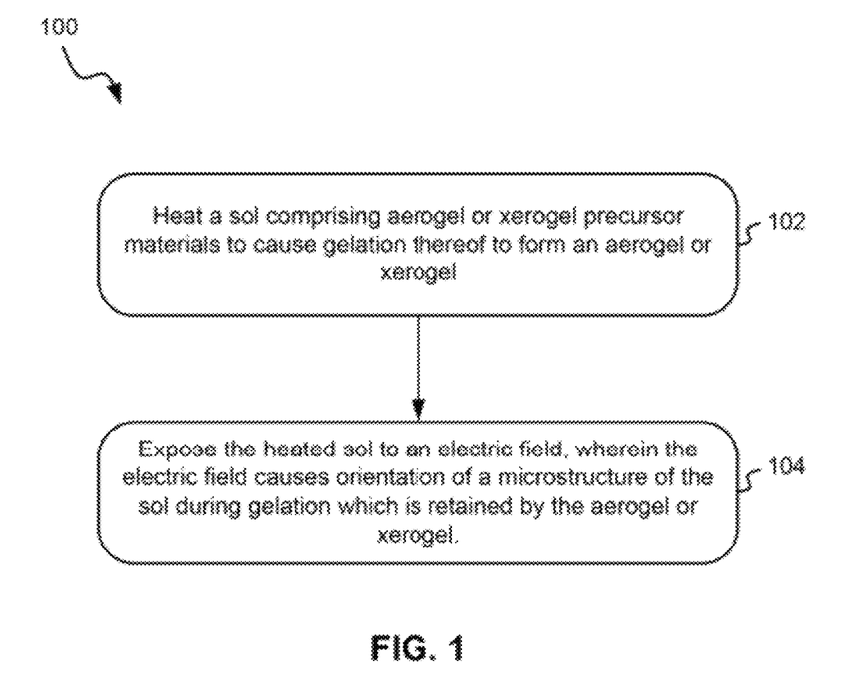
FIG. 1 is a flow diagram of a method for forming an aerogel or xerogel, according to one embodiment.

FIG. 1 shows a method 100 for controlling pore morphology in aerogels using electric fields, according to one embodiment. The method 100 may be carried out in any desired environment, including those described herein and others that would be understood by one of skill in the art upon reading the present descriptions.

In operation 102, a sol, including aerogel or xerogel precursor materials is heated in order to cause gelation thereof and form and aerogel or xerogel. Any precursor materials may be used as would be known to one of skill in the art.

In one embodiment, the aerogel or xerogel precursor materials may include a mixture of resorcinol, formaldehyde, and a base or acid catalyst to facilitate a reaction between the resorcinol and the formaldehyde. Alternatively, the aerogel or xerogel precursor materials may include a mixture of alcohol, tetramethyl orthosilicate (TMOS), tetraethyl orthosilicate (TEOS), and an acid or base catalyst to facilitate a reaction between the alcohol and the TEOS and/or TMOS.

In another embodiment, the sol may comprise a plurality of particles, such as fluoroapatite, which in some embodiments may be electrically conductive. The plurality of particles may have a length of between about 1 µm and about 3 µm, and a width of between about 150 nm and about 500 nm, in one approach.

Subsequently, in operation 104, the heated sol is exposed to an electric field, causing orientation of a microstructure of the sol during gelation, which is retained by the aerogel or xerogel after gelation of the sol. The sol may be exposed to the electric field prior to being heated, while being heated, after being heated, and/or during all periods, in various embodiments, as understood by one having ordinary skill in the art upon reading the present descriptions.

In some embodiments, the plurality of particles, as described above, may remain in the aerogel or xerogel after gelation of the sol. In an alternate embodiment, the method 100 may comprise removing the plurality of particles from the aerogel or xerogel, such as through burning, purging, washing, or any other method of removal as would be understood by one of skill in the art.

According to some embodiments, major pores of the aerogel or xerogel may be aligned along a single axis consistent with the electric field, as described in more detail later.

In more embodiments, the microstructure of the aerogel or xerogel may comprise column structures having minor pores therein, the column structures being separated by major pores aligned with the electric field, as described in more detail later.

In some approaches, the electric field may include an alternating current (AC) field having an electric field strength of between about 100 V/cm and about 500 V/cm, such as a field strength of about 300 V/cm. Of course, other strengths and types of electric fields may be used as would be understood by one of skill in the art upon reading the present descriptions.

In more approaches, the electric field may alternatively or additionally include a bias direct current (DC) electric field having an electric field strength of between about 0.5 V/cm and about 10 V/cm, which may be applied during gelation of the sol. Of course, other strengths and types of electric fields may be used as would be understood by one of skill in the art upon reading the present descriptions.

For example, in one approach, an organic sol may be formed by combining 1.5 g water, 1.25 g resorcinol, 1.8 g formaldehyde, and 44 µl acetic acid in solution. This solution may be simultaneously heated and subjected to an electric field of 300 V/cm until gelation completes. After gelation, the sample may be washed in acetone and dried in air at room temperature to obtain a finalized organic aerogel material with controlled pore morphology.

Although the final aerogel product may be obtained without supercritical drying, in ambient air, alternative approaches may additionally include converting the organic aerogel product to a carbon aerogel by pyrolization at temperatures exceeding about 600° C. in an inert, supercritical pressure environment. For example, carbonization of an aerogel formed using the process described immediately above may be accomplished by pyrolyzing the organic aerogel at 1050° C. in a nitrogen environment.

While the preceding examples describe an organic aerogel comprising resorcinol-formaldehyde and, upon pyrolization, a carbon aerogel, other suitable materials such as silica, alumina, titania, or any other metal-oxide or material capable of carrying an electrostatic charge may also serve as the material of which the aerogel may be based.

In some specific embodiments, the aerogel or xerogel may comprise at least one of: a carbon aerogel or xerogel, a silica aerogel or xerogel, an alumina aerogel or xerogel, and a titania aerogel or xerogel.

Figure 2:
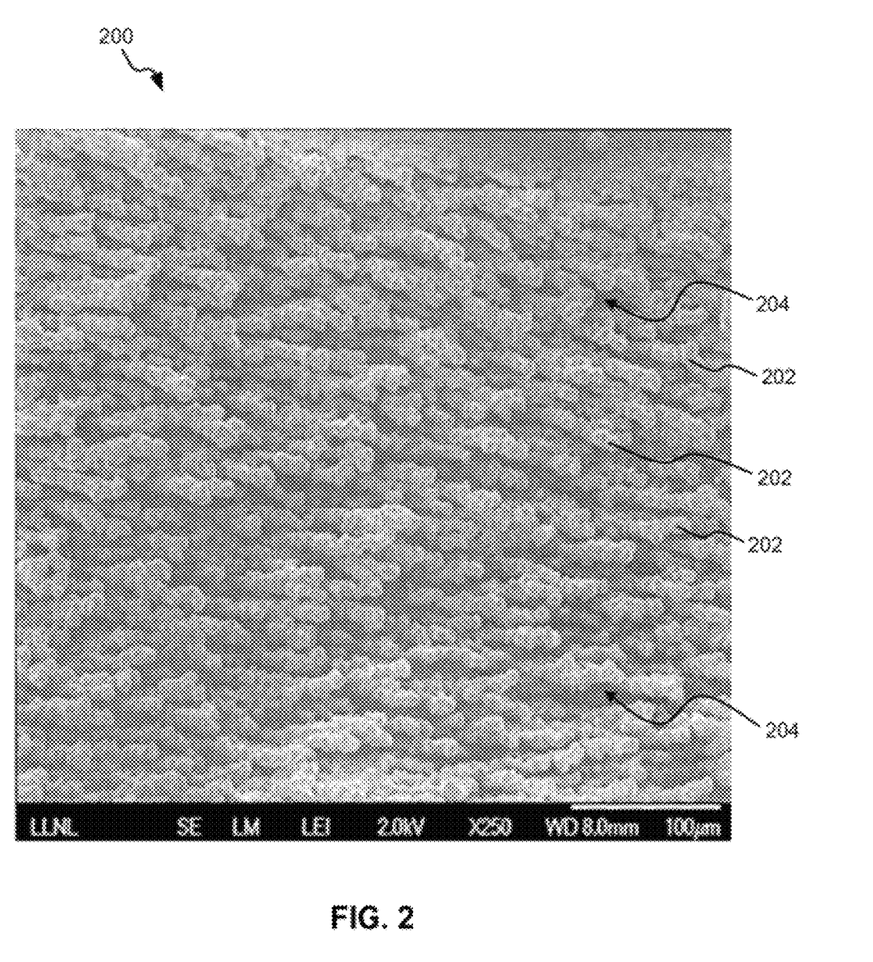
FIG. 2 shows an SEM image of columnar microstructures within an aerogel or xerogel, according to one embodiment.
Figures 3A, 3B, 3C, 3D:
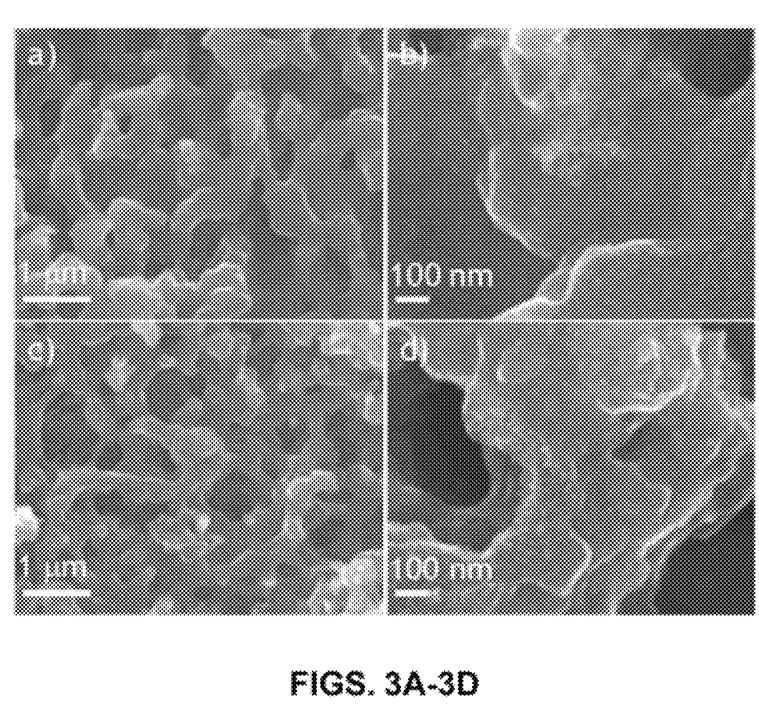
FIGS. 3A-3D show SEM images of layers of an aerogel or xerogel microstructure with a controlled pore morphology, according to one embodiment.

FIG. 2 shows a scanning electron microscope (SEM) image highlighting the column microstructures 202 characteristic of an aerogel or xerogel 200 with pore morphology controlled by electric fields, according to one embodiment.

According to one embodiment, an aerogel or xerogel 200 comprises column structures 202 comprising a material. Each of the column structures 202 have minor pores therein (too small to be seen in FIG. 2). The aerogel or xerogel 200 also comprises major pores 204 devoid of the material positioned between the column structures 202. Longitudinal axes of the major pores 204 are substantially parallel to one another.

For ease of understanding, in some embodiments, the minor pores may be defined as having a smaller median volume than the median volume of the major pores 204, e.g., the aerogel or xerogel 200 exhibits hierarchical porosity where two different dominant pore sizes exist, minor pores and major pores 204. Furthermore, the major pores 204 may be those pores in-between the column structures 202, and the minor pores may be those pores within each column structure 202, as would be understood by one of skill in the art. In some approaches, the longitudinal axis of each major pore 204 may be aligned along a single axis consistent with the electric field, e.g., each column structure 202 is aligned in a single direction.

According to one embodiment, the material may comprise at least one of: carbon, silica, alumina, and titania, or any other suitable material for use in an aerogel or xerogel, as would be understood by one of skill in the art.

In another embodiment, the aerogel or xerogel 200 may have structural characteristics of being formed from a sol exposed to an electric field that causes orientation of a microstructure of the sol during gelation which is retained by the aerogel or xerogel 200. This orientation of the microstructure, in some embodiments, is the column structures 202 and major pores 204 therebetween. In a further embodiment, the aerogel or xerogel 200 may have structural characteristics of being formed from a sol having a plurality of particles therein which are caused to move in a direction consistent with the electric field. This is described in more detail later.

In further embodiments, the material may retain the plurality of particles after formation thereof. In one embodiment, the plurality of particles may include fluoroapatite, e.g., $Ca_5(PO_4)_3F$, and in some embodiments may be electrically conductive. Of course, other sizes and/or types of particles may be used as would be understood by one of skill in the art upon reading the present descriptions.

In another embodiment, the particles may have a length of between about 1 µm and about 3 µm, and a width of between about 150 nm and about 500 nm. This particle size range may provide for well defined column structures, and may prevent the column structures from clumping, exceeding a useable width, or forming in contact with each other, which would degrade or otherwise ruin or destroy the product formed, as the porosity of the final product would not be representative of an aerogel or xerogel.

In another approach, the aerogel or xerogel 200 may have structural characteristics of being formed in a process that does not use templating. As described previously, templating adds a cumbersome step to the process of aerogel or xerogel formation, and therefore any way of eliminating this step is beneficial.

SEM analysis of carbon aerogels formed using the techniques described herein according to various embodiments shows that the microstructure of the aerogel cured in the electric field may be very different from that of the aerogel cured without any electric field present. In particular, without the use of any template, the pores in the aerogel cured in the electric field are all aligned along a single axis, while the microstructure of a traditional aerogel is random in nature unless applied using a template. These properties may be referred to as structural characteristics of the aerogel or xerogel being formed in an electric field, which may be accomplished without the use of templating.

According to one embodiment, these characteristics may include escaping the limitations of a templating material's shape and/or structure. In other embodiments, these structural characteristics may include elongated major pores devoid of material between column structures of the material, where the longitudinal axes of the major pores are substantially parallel to the longitudinal axes of the column structures.

In one embodiment, an aerogel or xerogel comprises elongated major pores extending between a material arranged in column structures, each column structure having a plurality of minor pores therein. A longitudinal axis of each of the elongated major pores are substantially parallel to a single axis, and the aerogel or xerogel has structural characteristics of being formed from a sol exposed to an electric field that causes orientation of a microstructure of the sol during gelation which is retained by the elongated major pores of the aerogel or xerogel.

According to one approach, the material comprises at least one of: carbon, silica, alumina, and titania, or any other suitable material.

In another approach, the material may comprise a plurality of particles having a length of between about 1 µm and about 3 µm, and a width of between about 150 nm and about 500 nm, such as particles of fluoroapatite. In more approaches, the plurality of particles may be electrically conductive.

In yet another approach, the aerogel or xerogel may have structural characteristics of being formed from a sol having a plurality of particles therein which are caused to move in a direction consistent with the electric field. In a specific approach, the aerogel or xerogel may have structural characteristics of being formed in a process that does not use templating.

FIGS. 3A-3D show an example of microstructures that are enabled by controlling pore morphology in an aerogel or xerogel using electric fields, according to several embodiments. In addition to having a high surface area, these materials are characterized by a column (or trabecular) microstructure which includes a plurality of nanoscale pores (minor pores) within a microscale porous interconnecting pore network (major pores).

In particular, in some embodiments, the microscale interconnecting pore network may be comprised of the gaps between the column structures, with the nanoscale porosity being primarily comprised within the column or trabecular microstructure of the aerogel or xerogel, according to some embodiments.

In further embodiments, additional benefits of the sol-gel production methods as described herein may include improved nanostructure resistance to radiation damage since damage sites within materials can easily and quickly migrate to surfaces and thus relieve stresses and gas build up in the matrix. Nanostructures may thus have tailored porosities and densities that enable optimization of radionuclide production and/or release rates.

Figure 4A:
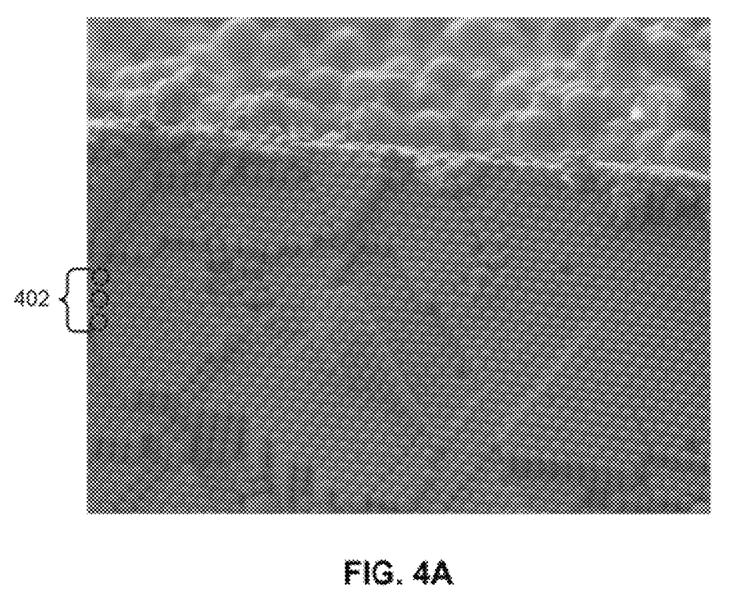
FIG. 4A is a SEM image of an aerogel or xerogel scaffold during formation, according to one embodiment.

Additionally, the ability to template sol-gel produced materials around micro- to macro-scale removable templates has been developed. In one exemplary embodiment, as shown in FIG. 4A, a plurality of polystyrene beads 402 may act as a removable scaffolding material.

Figure 4B:
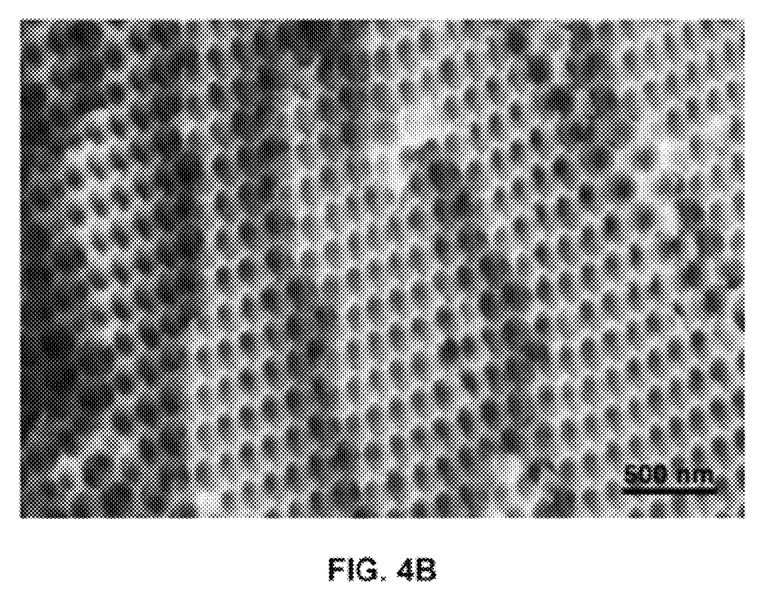
FIG. 4B is a SEM image of an aerogel or xerogel microstructure and pore morphology after scaffold removal, according to one embodiment.

Upon removing the scaffolding material, according to one embodiment, the aerogel or xerogel may exhibit a highly organized porous architecture, as depicted in FIG. 4B. This microstructure may be retained after gelation by the elongated major pores of the aerogel or xerogel, according to some approaches, or may be changed or altered during this precess.

Alternatively, the scaffolding material may be a dopant or catalyst capable of interacting with compositions of matter coming into proximity or contact with the aerogel or xerogel. In these embodiments, the scaffolding material may remain embedded within the aerogel or xerogel structure in order to facilitate subsequent interactions.

Figure 5:
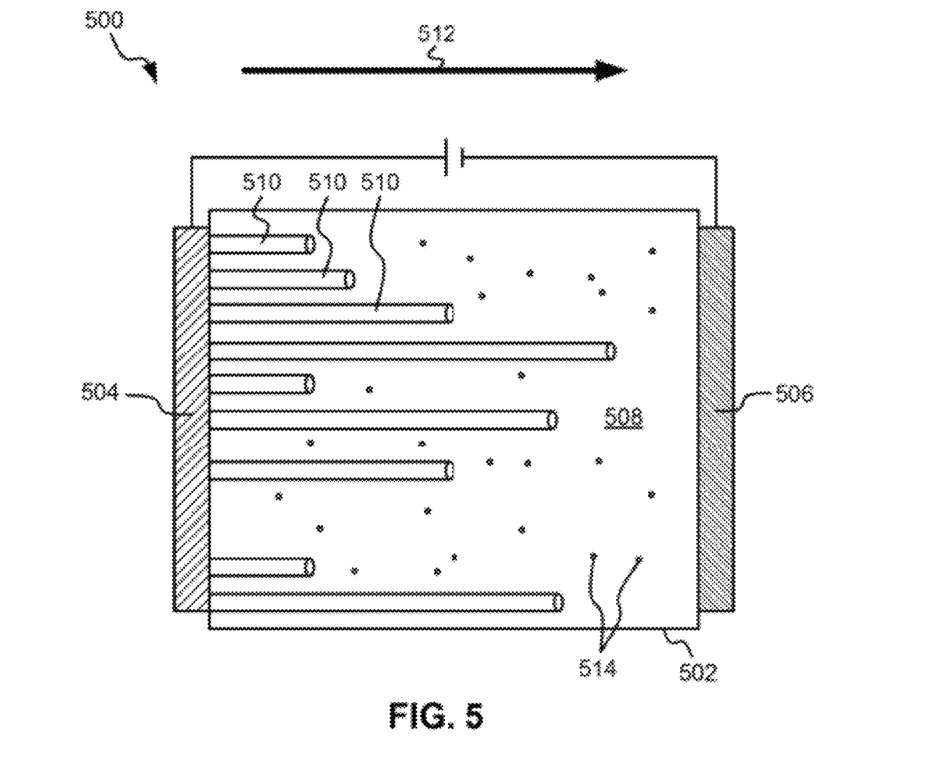
FIG. 5 depicts a schematic of an apparatus for producing an aerogel or xerogel with controlled pore morphology in electric fields, according to one embodiment.

FIG. 5 depicts an apparatus 500 for forming an aerogel or xerogel with controlled pore morphology in an electric field, according to one embodiment. As shown, the apparatus 500 includes an electrophoresis chamber 502 or some other suitable chamber connected to two terminal electrodes of opposing polarity, a cathode 504 and an anode 506, which may be on either side of the chamber 502, as would be understood by one of skill in the art. In operation, a solution 508 comprising solvated aerogel or xerogel precursor materials 514 may be introduced to the electrophoresis chamber 502. The precursor materials 514 may be deposited toward one electrode and aligned into column structures 510 along a longitudinal axis 512 upon applying an electric field to the solution 508. Of course, which of the two electrodes where the precursor material 514 is deposited will depend on the charge of the materials in solution 508 as caused by the electric field.

In some embodiments, the aerogels and/or xerogels may be expanded to more complicated macro-scale geometries, for example using a removable template with a fractal structure such as those typical in bronchiolar passages.

Furthermore, application of an electric field during the gelation step of the sol-gel process may induce textured porosity aligned with the field, according to other embodiments. This alignment may be utilized to create anisotropic transport rates to optimize radionuclide release.

The methods and systems described herein are particularly useful in a variety of fields and applications. In one exemplary application, an aerogel or xerogel exhibiting controlled pore morphology may serve as a scaffold for biofunctionalization applications. For example, labeled nanoparticles, such as fluorescent or dye-doped nanoparticles and luminescent quantum dots, may be deposited along the porous microstructure and serve as probes for detecting biomolecules or organisms, with high resolution and specificity.

In another application, an aerogel or xerogel may facilitate culturing of microorganisms by depositing microorganisms along, for example, a carbon aerogel electrode exhibiting the presently described columnar structures with microporous channels existing therebetween. Researchers may then facilitate the growth, metabolism, reproduction, or other similar biological processes of the deposited organisms by providing desired substances thereto along the microporous channels with the assistance of electric fields. Similarly, researchers may employ the same channels and fields to collect biomolecules and other metabolites produced and/or secreted by organisms deposited on the porous latticework.

In some embodiments, microporosity between columnar and/or trabecular structures along the longitudinal axis of the aerogel or xerogel may facilitate mass transport along the same axis, resulting from decreased collision rates along the micropore structure. In addition, these structures permit mass transport at decreased pressures relative to structures exhibiting random porosity. Similarly, other mass transport applications may include facilitating movement of fluids capacitors, batteries, for filtration, etc.

In some embodiments, a column structure may be controlled at multiple length scales, concurrently optimizing surface area for nucleation sites, reaction sites, and bulk mass transport.

According to more uses, rare isotope beam (RIB) targets must withstand extreme operating conditions, and current methods produce crystals typically capable of withstanding such conditions for only a limited duration of approximately one to two weeks, frustrating efficient and smooth research operations in many isotope mass separation online (ISOL) facilities. By using the material production methods disclosed herein to engineer both the microstructure and macrostructure of targets, researchers may improve the performance of ISOL facilities with carbo-thermal reduction of composite monolith targets, leading to high surface area carbide foams with high temperature stability capable of outperforming current RIB targets.

In additional embodiments, the materials produced using the methods described herein may be tested for temperature stability and thermal conductivity prior to online testing at various ISOL facilities, while optimizing radionuclide release rates due to the ability to tailor the microstructures and macrostructures of the targets.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An aerogel, comprising:

column structures comprising a carbon material, the column structures having minor pores therein; and major pores devoid of the carbon material positioned between the column structures, longitudinal axes of the major pores being substantially parallel to one another, wherein the aerogel has structural characteristics of being formed from a sol having aerogel precursor materials and a plurality of electrically conductive particles therein, the plurality of electrically conductive particles being configured to move in a direction consistent with an electric field to generate the column structures, wherein the plurality of electrically conductive particles are retained in the aerogel.

2. The aerogel as recited in claim 1, wherein the each of the electrically conductive particles are non-spherical.

3. The aerogel as recited in claim 1, wherein the plurality of electrically conductive particles each independently have a length of between about 1 μm and about 3 μm, and a width of between about 150 nm and about 500 nm.

4. The aerogel as recited in claim 1, wherein the aerogel has structural characteristics of being formed in a process that does not use templating.

5. An aerogel or xerogel, comprising:

elongated major pores extending between a carbon material arranged in column structures, each column structure having a plurality of minor pores therein, wherein a longitudinal axis of each of the elongated major pores are substantially parallel to a single axis; and a plurality of non-spherical, electrically conductive particles, each of the plurality of non-spherical, electrically conductive particles having a length between about 1 μm and about 3 μm, and a width of between about 150 nm and about 500 nm.

6. The aerogel or xerogel as recited in claim 5, wherein the aerogel or xerogel has structural characteristics of being formed from a sol having the plurality of particles therein, wherein the plurality of particles are configured to move substantially along a single axis in a direction consistent with an electric field to generate the column structures.

7. The aerogel or xerogel as recited in claim 5, wherein each of the plurality of particles are non-spherical.

8. The aerogel or xerogel as recited in claim 5, further comprising fluorescent nanoparticles deposited along the column structures.

9. An aerogel or xerogel, comprising:
column structures comprising a carbon material, the column structures having minor pores therein;
fluorescent nanoparticles deposited along the column structures; and
major pores devoid of the carbon material positioned between the column structures, longitudinal axes of the major pores being substantially parallel to one another;
wherein the aerogel or xerogel has structural characteristics of being formed from a sol having aerogel or xerogel precursor materials and a plurality of electrically conductive particles therein, the plurality of electrically conductive particles being configured to move in a direction consistent with an electric field to generate the column structures; and
wherein the plurality of electrically conductive particles are retained in the aerogel or xerogel.

10. An aerogel, comprising:
column structures comprising carbon, the carbon column structures having minor pores therein;
major pores devoid of carbon positioned between the carbon column structures, longitudinal axes of the major pores being substantially parallel to one another;
one or more fluorescent nanoparticles deposited along at least one surface of each column structure; and
a plurality of non-spherical particles that are electrically conductive,
wherein the aerogel has structural characteristics of being formed from a sol having aerogel precursor materials and the plurality of non-spherical particles therein, the plurality of non-spherical particles being configured to move in a direction consistent with an electric field to generate the column structures.

* * * * *